US012590195B2

(12) United States Patent
Ishida et al.

(10) Patent No.: US 12,590,195 B2
(45) Date of Patent: Mar. 31, 2026

(54) POLYPROPYLENE FILM, POLYPROPYLENE FILM INTEGRATED WITH METAL LAYER, AND FILM CAPACITOR

(71) Applicant: OJI HOLDINGS CORPORATION, Tokyo (JP)

(72) Inventors: Tatsuji Ishida, Tokyo (JP); Takeshi Tominaga, Tokyo (JP); Tadakazu Ishiwata, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 334 days.

(21) Appl. No.: 18/253,167

(22) PCT Filed: Nov. 15, 2021

(86) PCT No.: PCT/JP2021/041831
§ 371 (c)(1),
(2) Date: May 16, 2023

(87) PCT Pub. No.: WO2022/107706
PCT Pub. Date: May 27, 2022

(65) Prior Publication Data
US 2023/0416479 A1      Dec. 28, 2023

(30) Foreign Application Priority Data
Nov. 17, 2020    (JP) ................................. 2020-190984

(51) Int. Cl.
| | | |
|---|---|---|
| *C08J 5/18* | (2006.01) | |
| *H01G 4/258* | (2006.01) | |
| *H01G 4/32* | (2006.01) | |

(52) U.S. Cl.
CPC ................ *C08J 5/18* (2013.01); *H01G 4/258* (2013.01); *H01G 4/32* (2013.01); *C08J 2323/12* (2013.01)

(58) Field of Classification Search
CPC ......... C08J 5/18; C08J 2323/12; H01G 4/258; H01G 4/32
See application file for complete search history.

(56) References Cited

U.S. PATENT DOCUMENTS

| | | | |
|---|---|---|---|
| 2013/0288000 A1* | 10/2013 | Ishiwata | C08J 5/18 |
| | | | 428/141 |
| 2018/0208751 A1 | 7/2018 | Taniike et al. | |
| 2019/0284354 A1 | 9/2019 | Tominaga et al. | |
| 2020/0157327 A1 | 5/2020 | Yabe et al. | |
| 2020/0377706 A1 | 12/2020 | Ishida et al. | |
| 2023/0044276 A1 | 2/2023 | Ishida et al. | |

FOREIGN PATENT DOCUMENTS

| | | | | |
|---|---|---|---|---|
| EP | 3608353 A1 | 2/2022 | | |
| JP | 2007-246898 A | 9/2007 | | |
| JP | 2015078275 A * | 4/2015 | | |
| JP | 2016-012705 A | 1/2016 | | |
| JP | 2017-057247 A | 3/2017 | | |
| JP | 2017-101229 A | 6/2017 | | |
| JP | 2019167512 A * | 10/2019 | | |
| JP | 2019167513 A * | 10/2019 | | |
| JP | 2020-100800 A | 7/2020 | | |
| WO | WO 2015/022003 A | 2/2015 | | |
| WO | WO-2016159069 A1 * | 10/2016 | ............ | C08F 110/06 |
| WO | WO 2018/056404 A1 | 3/2018 | | |
| WO | WO-2018181938 A1 * | 10/2018 | ............... | H01G 4/32 |
| WO | WO-2018186424 A1 * | 10/2018 | ........... | B32B 15/085 |
| WO | WO 2019/022004 A1 | 1/2019 | | |
| WO | WO-2019131815 A1 * | 7/2019 | ........... | B32B 27/327 |
| WO | WO 2020/045482 A1 | 3/2020 | | |
| WO | WO 2020/217930 A1 | 10/2020 | | |

OTHER PUBLICATIONS

International Search Report received in International Application No., PCT/JP2021/041831, mailed on Feb. 1, 2022, in 3 pages.
Extended European Search Report for EP Appl. No. 21894580.6 dated Sep. 10, 2024, in 8 pages.

* cited by examiner

*Primary Examiner* — Michael P McFadden
(74) *Attorney, Agent, or Firm* — Knobbe, Martens, Olson & Bear, LLP

(57)      ABSTRACT

Provided is a polypropylene film having a high dielectric breakdown strength at high temperatures. Provided is a polypropylene film in which a polypropylene resin constituting the polypropylene film has a molecular-weight distribution (Mw/Mn) of the weight-average molecular weight Mw to the number-average molecular weight Mn of has a Z-average molecular weight Mz of 950,000-1,500,000, and has a weight proportion w of 2.6-4.2% in an integral molecular-weight distribution curve when the logarithmic molecular weight Log(M) is 4.0.

11 Claims, No Drawings

POLYPROPYLENE FILM, POLYPROPYLENE FILM INTEGRATED WITH METAL LAYER, AND FILM CAPACITOR

TECHNICAL FIELD

The present disclosure relates to a polypropylene film, a metal layer-integrated polypropylene film, and a film capacitor.

BACKGROUND ART

Polypropylene films can be used as capacitor derivatives. For example, polypropylene films can be used as capacitor derivatives in inverters constituting power control units of hybrid cars, electric cars, and the like.

PRIOR ART DOCUMENT

Patent Document

Patent Document 1: WO 2018/056404 A

SUMMARY OF THE INVENTION

Problems to be Solved by the Invention

From the viewpoint of the above-described use environment (for example, an environment in which a temperature rises in an engine room, self-heating of a capacitor, or the like), a capacitor using the polypropylene film as a capacitor derivative desirably has excellent heat resistance at a high temperature of about 120° C. (100° C. to 120° C.) while being compact, lightweight, and high-capacity. That is, the capacitor is required to have safety that can withstand long-term use under high temperatures and high voltages and lifetime performance that suppresses a decrease in capacitance.

A polypropylene film for producing such a capacitor is required to have a dielectric breakdown strength when a direct current voltage is applied at the above-described high temperatures even when the thickness of the film is thin (for example, less than 20 μm).

Under such circumstances, a main object of the present disclosure is to provide a polypropylene film having a high dielectric breakdown strength at high temperatures. An object of the present disclosure is also to provide a metal layer-integrated polypropylene film and a film capacitor which use the polypropylene film.

Means for Solving the Problem

The inventors of the present disclosure have conducted intensive studies in order to solve the above problems. As a result, the inventors have found that a polypropylene film exhibits a high dielectric breakdown strength at high temperatures, in which a polypropylene resin constituting the polypropylene film has a molecular-weight distribution (Mw/Mn) of a weight-average molecular weight Mw to a number-average molecular weight Mn of 5.0 or more and 6.9 or less, has a Z-average molecular weight Mz of 950,000 or more and 1,500,000 or less, and has a weight proportion w of 2.6% or more and 4.0% or less when a logarithmic molecular weight Log(M) is 4.0 in an integral molecular-weight distribution curve. The present inventors have conducted further studies based on the findings, leading to the completion of the present disclosure.

That is, the present disclosure includes the following.

Item 1. A polypropylene film comprising a polypropylene resin, the polypropylene resin having a molecular-weight distribution (Mw/Mn) of a weight-average molecular weight Mw to a number-average molecular weight Mn of 5.0 or more and 6.9 or less, having a Z-average molecular weight Mz of 950,000 or more and 1,500,000 or less, and having a weight proportion w of 2.6% or more and 4.0% or less when a logarithmic molecular weight Log(M) is 4.0 in an integral molecular-weight distribution curve.

Item 2. The polypropylene film described in item 1, in which the polypropylene film is used for a capacitor.

Item 3. The polypropylene film described in item 1 or 2, in which the polypropylene film is a biaxially stretched film.

Item 4. The polypropylene film described in any one of items 1 to 3, in which a density as measured according to Method D in HS K7112:1999 is 919 kg/m$^3$ or more and 925 kg/m$^3$ or less.

Item 5. The polypropylene film described in any one of items 1 to 4, in which a dielectric breakdown strength (DCES) at a direct current voltage at 120° C. is 530 V/μm or more.

Item 6. The polypropylene film described in any one of items 1 to 5, in which the polypropylene resin contains a polypropylene resin A and a polypropylene resin B different from the polypropylene resin A, an Mw of the polypropylene resin A is 250,000 or more and less than 350,000, a molecular-weight distribution (Mw/Mn) of the polypropylene resin A is 5.5 or more and 10.0 or less, a melt flow rate (MFRA) of the polypropylene resin A is 3.0 g/10 min or more and 10.0 g/10 min or less, and a content of the polypropylene resin A in the polypropylene resin is larger than a content of the polypropylene resin B in the polypropylene resin.

Item 7. The polypropylene film described in any one of items 1 to 6, in which the polypropylene resin contains a polypropylene resin A and a polypropylene resin B different from the polypropylene resin A, an Mw of the polypropylene resin B is 300,000 or more and 550,000 or less, a molecular-weight distribution (Mw/Mn) of the polypropylene resin B is 5.0 or more and 11.0 or less, a melt flow rate (MFRB) of the polypropylene resin B is 0.1 g/10 min or more and 3.0 g/10 min or less, and a content of the polypropylene resin A in the polypropylene resin is larger than a content of the polypropylene resin B in the polypropylene resin.

Item 8. The polypropylene film described in item 6 or 7, in which a ratio of a mass of the polypropylene resin A to a total mass of the polypropylene resin A and the polypropylene resin B is 55 mass % or more and 75 mass % or less.

Item 9. The polypropylene film described in any one of items 1 to 8, in which a thickness of the polypropylene film is 1.0 μm or more and 2.4 μm or less.

Item 10. A polypropylene film comprising a polypropylene resin, the polypropylene resin having a Z-average molecular weight Mz of 950,000 or more and 1,500,000 or less and having a dielectric breakdown strength (DCES) at a direct current voltage at 120° C. of 530 V/μm or more.

Item 11. A metal layer-integrated polypropylene film including:

the polypropylene film described in any one of items 1 to 10; and a metal layer laminated on one surface or both surfaces of the polypropylene film.

Item 12. A film capacitor comprising the wound metal layer-integrated polypropylene film described in item 11 or a configuration in which a plurality of the metal layer-integrated polypropylene films described in item 11 are laminated.

Item 13. The film capacitor described in item 12, in which an insulation resistance value at an ambient temperature of 115° C. is 20 MΩ·μF or more.

Advantages of the Invention

According to the present disclosure, it is possible to provide a polypropylene film having a high dielectric breakdown strength at high temperatures. According to the present disclosure, it is also possible to provide a metal layer-integrated polypropylene film and a film capacitor which use the polypropylene film.

EMBODIMENTS OF THE INVENTION

Hereinafter, a polypropylene film, a metal layer-integrated polypropylene film, and a film capacitor of the present disclosure and production methods therefor will be described in detail.

In the present specification, "to" in a numerical range means "or more and or less". That is, the notation "α to β" means "α or more and β or less" or "β or more and α or less", and includes α and β as ranges. When a plurality of lower limit values and a plurality of upper limit values are mentioned separately, any lower limit value and any upper limit value can be selected and connected with "to".

In the present specification, polypropylene may be abbreviated as "PP", and a polypropylene resin may be abbreviated as "PP resin".

In the present specification, the terms "contain" and "comprise" include the concepts of "contain", "comprise", "substantially consist of", and "consist of".

In the present specification, the term "capacitor" includes the concepts of "capacitor", "capacitor element", and "film capacitor".

In the present specification, a direction of a polypropylene film is as follows. First, the machine direction of the film is the same as the machine direction (hereinafter, referred to as "MD direction"). The MD direction may be referred to as the length direction or the flow direction. Next, the lateral direction of the film is the same as the transverse direction (hereinafter, referred to as "TD direction"). The TD direction may be referred to as the width direction.

Polypropylene Film

In a polypropylene film of the present disclosure, a polypropylene resin constituting the polypropylene film has a molecular-weight distribution (Mw/Mn) of a weight-average molecular weight Mw to a number-average molecular weight Mn of 5.0 or more and 6.9 or less, has a Z-average molecular weight Mz of 950,000 or more and 1,500,000 or less, and has a weight proportion w of 2.6% or more and 4.0% or less when a logarithmic molecular weight Log(M) is 4.0 in an integral molecular-weight distribution curve. Hereinafter, the weight-average molecular weight, the number-average molecular weight, the molecular-weight distribution, the Z-average molecular weight, and the weight proportion may be abbreviated as "Mw", "Mn", "Mw/Mn", "Mz", and "w", respectively.

When each of the molecular-weight distribution (Mw/Mn) of the weight-average molecular weight Mw to the number-average molecular weight Mn, Z-average molecular weight Mz, and weight proportion w when the logarithmic molecular weight Log(M) is 4.0 in the integral molecular-weight distribution curve of the polypropylene resin constituting the film is in the above specific range, the polypropylene film of the present disclosure has a high dielectric breakdown strength when a direct current voltage is applied at a high temperature of about 120° C. (100° C. to 120° C.) even when the thickness of the film is thin (for example, less than 20 μm, less than 10 μm, or less than 6 μm). The film capacitor of the present disclosure, which uses the polypropylene film of the present disclosure as a capacitor derivative, has excellent heat resistance at a high temperature of about 120° C. (100° C. to 120° C.), and specifically, the film capacitor of the present disclosure has excellent lifetime performance in terms of suppressing a decrease in capacitance of the capacitor even after use for a long period of time at the above high temperature. Therefore, the polypropylene film of the present disclosure is suitable for use in a film capacitor. Although the presence of stretching in the polypropylene film of the present disclosure is not limited, considering the above applications, the polypropylene film is preferably a biaxially stretched film.

Both surfaces of the polypropylene film in the present disclosure are defined as a first surface and a second surface. The first surface can be a rough surface. When the first surface is a rough surface, element winding in the production of capacitors is less likely to result in wrinkles. The second surface can also be a rough surface.

The thickness of the polypropylene film is preferably 0.8 μm or more and 6.0 μm or less from the viewpoint of ensuring a decrease in size and an increase in capacitance of a capacitor when the polypropylene film is used for a capacitor. Specifically, the thickness of the polypropylene film is preferably 5.5 μm or less, more preferably 3.5 μm or less, further preferably 3.0 μm or less, and particularly preferably 2.4 μm or less. The thickness of the polypropylene film is preferably 1.0 μm or more, more preferably 1.8 μm or more, and further preferably 2.2 μm or more, in terms of production. The method for measuring the thickness of the polypropylene film in the present specification is as described in Examples The density of the polypropylene film is not limited, and for example, is preferably set to 919 kg/m³ or more and 925 kg/m³ or less, in consideration of capacitor application. The method for measuring the density of the polypropylene film in the present specification is as described in Examples In the polypropylene film of the present disclosure, the molecular-weight distribution (Mw/Mn) of the polypropylene resin constituting the polypropylene film (after mixing when the polypropylene resin is composed of a mixture of a plurality of resins) is 5.0 or more and 6.9 or less.

The molecular-weight distribution (Mw/Mn) may be 5.0 or more and 6.9 or less, but the lower limit value is preferably 5.2 or more, more preferably 6.0 or more, further preferably 6.2 or more, and even more preferably 6.3 or more. The upper limit value is preferably 6.5 or less. When the molecular-weight distribution (Mw/Mn) is within such a range, a polypropylene film having an excellent dielectric breakdown strength at high temperatures and reduced heat shrinkage in the machine direction (MD) can be obtained as an effect of the combination with other requirements.

In the polypropylene film of the present disclosure, Mz of the polypropylene resin constituting the polypropylene film (after mixing when the polypropylene resin is composed of a mixture of a plurality of resins) is 950,000 or more and 1,500,000 or less.

Mz may be 950,000 or more and 1,500,000 or less, but the lower limit value is preferably 1,000,000 or more, more preferably 1,050,000 or more, and further preferably 1,100,000 or more. The upper limit value is preferably 1,400,000 or less, more preferably 1,300,000 or less, and further preferably 1,200,000 or less. When Mz is within such a range, dielectric breakdown strength at high temperatures is excellent as an effect of the combination of the molecular-weight distribution Mw/Mn described above and a weight proportion w described below.

In the polypropylene film of the present disclosure, the weight proportion w of the polypropylene resin constituting the polypropylene film (after mixing when the polypropylene resin is composed of a mixture of a plurality of resins) is 2.6% or more and 4.0% or less when the logarithmic molecular weight Log(M) is 4.0 in the integral molecular-weight distribution curve.

The weight proportion w may be 2.6% or more and 4.0% or less, but the lower limit value is preferably 2.8% or more, more preferably 3.0% or more, further preferably 3.2% or more, and even more preferably 3.4% or more. The upper limit value is preferably 3.9% or less. When the weight proportion w is within such a range, dielectric breakdown strength at high temperatures is excellent as an effect of the combination of the molecular-weight distribution Mw/Mn described above and the Z-average molecular weight Mz.

In a preferred embodiment of the polypropylene film of the present disclosure, the polypropylene resin constituting the polypropylene film (after mixing when the polypropylene resin is composed of a mixture of a plurality of resins) can include an embodiment as follows:

the molecular-weight distribution (Mw/Mn) is 6.3 or more and 6.9 or less, the Mz is 1,040,000 or more and 1,110,000 or less, and the weight proportion w is 3.5% or more and 4.0% or less. By using a polypropylene resin having such physical properties, a particularly high dielectric breakdown strength at high temperatures can be obtained.

The methods for measuring the Mw, Mn, Mz, molecular-weight distribution (Mw/Mn), and weight proportion w of the polypropylene resin constituting the polypropylene film in the present specification, as well as the Mw, Mn, Mz, molecular-weight distribution (Mw/Mn), molecular-weight distribution (Mz/Mn), differential distribution value when the logarithmic molecular weight Log(M) is 4.5, differential distribution value when the logarithmic molecular weight Log(M) is 6.0, difference in molecular weight differential values (DM), and weight proportion w of a polypropylene resin A and a polypropylene resin B when the polypropylene resin is composed of a plurality of resins, are according to the methods described in Examples.

The polypropylene film of the present disclosure contains a polypropylene resin. The content of the polypropylene resin is preferably 90 wt % or more and more preferably 95 wt % or more with respect to the entire polypropylene film (when the entire polypropylene film is taken as 100 wt %). The upper limit of the content of the polypropylene resin is, for example, 100 wt %, 98 wt %, or the like with respect to the entire polypropylene film.

The total ash content of the polypropylene resin is preferably as small as possible because of electrical characteristics. The total ash content is preferably 50 ppm or less, more preferably 40 ppm or less, and further preferably 30 ppm or less, based on the polypropylene resin. The lower limit of the total ash content is, for example, 2 ppm, 5 ppm, or the like. A less total ash content means that there are less impurities, such as polymerization catalyst residues.

The polypropylene resin may contain a single polypropylene resin alone or two or more polypropylene resins.

When two or more polypropylene resins are contained in the polypropylene film of the present disclosure, the polypropylene resin with the highest content is defined as a main component in the present specification, and is referred to as "polypropylene resin as a main component" or "base resin" in the present specification. When a single polypropylene resin is contained in the polypropylene film of the present disclosure, the polypropylene resin is also defined as a main component in the present specification, and is referred to as "polypropylene resin as a main component" in the present specification. When two or more polypropylene resins are contained in the polypropylene film of the present disclosure, a polypropylene resin different from the polypropylene resin with the highest content is referred to as "blend resin".

When two or more (particularly, two) polypropylene resins are contained in the polypropylene film of the present disclosure, the film can contain, for example, the following polypropylene resin B as a blend resin together with the following polypropylene resin A (a base resin as a main component). One of the polypropylene resins A may be a "base resin" and the other may be a "blend resin". A case where two polypropylene resins, that is, the polypropylene resin A as a base resin and the polypropylene resin B as a blend resin are used will be illustratively described below.

The content of the polypropylene resin A is more than 50 wt %, preferably 55 wt % or more, more preferably 60 wt % or more, and further preferably 65 wt % or more, with respect to 100 wt % of the polypropylene resin. The upper limit of the content of the polypropylene resin A is less than 100 wt %, preferably 95 wt % or less, more preferably 90 wt % or less, further preferably 80 wt % or less, and even more preferably wt % or less, with respect to 100 wt % of the polypropylene resin. Examples of the polypropylene resin A include isotactic polypropylene.

The weight-average molecular weight Mw of the polypropylene resin A is preferably 250,000 or more and 360,000 or less, more preferably 280,000 or more and 350,000 or less, and further preferably 300,000 or more and 350,000 or less. The upper limit is even more preferably less than 350,000. When Mw is 250,000 or more and 360,000 or less, it is easy to control the thickness of a cast rolled sheet in the production process of the polypropylene film, and thickness unevenness is less likely to occur.

The number-average molecular weight Mn of the polypropylene resin A is preferably 30,000 or more and 54,000 or less, more preferably 33,000 or more and 52,000 or less, and further preferably 33,000 or more and 47,000 or less. When Mn is or more and 54,000 or less, a capacitor element having excellent heat resistance is easily obtained.

The z-average molecular weight Mz of the polypropylene resin A is preferably 1,000,000 or more and 2,000,000 or less, and more preferably 125 or more and 1,800,000 or less. When Mz is 1,000,000 or more and 2,000,000 or less, a film having a high dielectric breakdown strength at high temperatures is easily obtained.

The molecular-weight distribution (Mw/Mn) of the polypropylene resin A is preferably 5.0 or more, more preferably 5.5 or more, and further preferably 6.0 or more. Mw/Mn of the polypropylene resin A is preferably 10.0 or less, more preferably 9.5 or less, and particularly preferably 8.5 or less. When Mw/Mn is 5.0 or more and 10.0 or less, stretchability is improved, and a thin film is easily obtained.

The molecular-weight distribution (Mz/Mn) of the polypropylene resin A is preferably 10 or more and 70 or less, more preferably 15 or more and 60 or less, and further preferably 15 or more and 50 or less. When Mz/Mn is 10 or more and 70 or less, stretchability is improved, and a thin film is easily obtained.

In the molecular-weight distribution curve of the polypropylene resin A, the differential distribution value when the logarithmic molecular weight Log(M) is 4.5 is preferably 28.0 or more. The upper limit value is preferably 32.0 or less. The differential distribution value when the logarithmic molecular weight Log(M) is 6.0 is preferably 17.0 or more and more preferably 20.0 or more. The upper limit value is preferably 30.0 or less and more preferably 28.0 or less. A difference obtained by subtracting a differential distribution value when the logarithmic molecular weight Log(M) is 6.0 from a differential distribution value when the logarithmic molecular weight Log(M) is 4.5 (difference in molecular weight differential values (DM)) is preferably 4.0 or more and 18.0 or less and more preferably 4.5 or more and 11.0 or less.

When a component at a logarithmic molecular weight Log(M) of 4.5 as a representative distribution value of components having a molecular weight from 10,000 to 100,000 (hereinafter, also referred to as "low-molecular-weight components") lower than the Mw value of the polypropylene resin A (for example, 250,000 or more and less than 350,000) is compared with a component at around Log(M) of 6.0 as a representative distribution value of components having a molecular weight of around 1,000,000 (hereinafter, also referred to as "high-molecular-weight components") higher than the Mw value of the polypropylene resin A, it is understood that the content of the low-molecular-weight components is larger at a ratio of 8.0% or more and 18.0% or less.

That is, a molecular-weight distribution Mw/Mn of 5.0 to 10.0 merely indicates the width of the molecular-weight distribution, and does not indicate the quantitative relationship between the high-molecular-weight component and the low-molecular-weight component within the distribution. Therefore, the polypropylene resin A according to the present disclosure preferably has a broad molecular-weight distribution and contains components having a molecular weight from 10,000 to 100,000 at a larger ratio of 8.0% or more and 18.0% or less in comparison with components having a molecular weight of 1,000,000. This is preferable because the crystallite size is reduced, and the polypropylene film tends to have a roughened surface.

The lower limit value of the weight proportion w of the polypropylene resin A is preferably 3.8% or more and more preferably 4.0% or more. The upper limit value is preferably 6.0% or less and more preferably 5.0% or less. When the weight proportion w of the polypropylene resin A is within such a range, the weight proportion w after mixing the polypropylene resin A and the polypropylene resin B is 2.6% or more and 4.0% or less due to the combination with the weight proportion w of the polypropylene resin B described below, so that a high dielectric breakdown strength at high temperatures is exhibited.

The melt flow rate (MFRA) of the polypropylene resin A at 230° C. is preferably 3.0 g/10 min or more and more preferably 3.5 g/10 min or more. The upper limit of MFRA is preferably 10.0 g/10 min or less, more preferably 8.0 g/10 min or less, further preferably 6.0 g/10 min or less, and particularly preferably 5.0 g/10 min or less. The method for measuring the melt flow rate (MFR) in the present specification is as described in Examples The unit "g/10 min" of the melt flow rate is also referred to as "dg/min".

In a preferred embodiment of the polypropylene film of the present disclosure, the polypropylene resin A can include an embodiment as follows:

Mw of the polypropylene resin A is 250,000 or more and less than 350,000, a molecular-weight distribution (Mw/Mn) of the polypropylene resin A is 5.5 or more and 10.0 or less, and a melt flow rate (MFRA) of the polypropylene resin A is 3.0 g/10 min or more and 10.0 g/10 min or less. The use of the polypropylene resin A having such physical properties makes it easy to mold a cast sheet (stretch precursor) by an extruder.

In a more preferred embodiment of the polypropylene film of the present disclosure, the polypropylene resin A can include an embodiment as follows:

Mw of the polypropylene resin A is 300,000 or more and less than 350,000, a molecular-weight distribution (Mw/Mn) of the polypropylene resin A is 6.0 or more and 9.5 or less, and a melt flow rate (MFRA) of the polypropylene resin A is 3.5 g/10 min or more and 5.0 g/10 min or less.

The heptane insoluble of the polypropylene resin A is preferably 97.0% or more. The heptane insoluble is preferably 98.5% or less. A higher heptane insoluble indicates higher resin stereoregularity. When the heptane insoluble (HI) is 97.0% or more and 98.5% or less, the moderately high stereoregularity moderately enhances the crystallinity of the polypropylene resin in the polypropylene film, and improves the dielectric breakdown strength at high temperatures. The rate of solidification (crystallization) is moderate during molding of the cast rolled sheet in the production process of the polypropylene film, and moderate stretchability is imparted. The method for measuring the heptane insoluble (HI) in the present specification is as described in Examples The total ash content of the polypropylene resin A is preferably as small as possible because of electrical characteristics. The total ash content is preferably 50 ppm or less, more preferably 40 ppm or less, and further preferably 30 ppm or less, based on the polypropylene resin A. The lower limit of the total ash content is, for example, 2 ppm, 5 ppm, or the like.

The polypropylene resin B is a polypropylene resin different from the polypropylene resin A. The content of the polypropylene resin B in the polypropylene film of the present disclosure is less than 50 wt %, preferably 49 wt % or less, more preferably 40 wt % or less, and particularly preferably 35 wt % or less, with respect to 100 wt % of the polypropylene resin. The lower limit of the content of the polypropylene resin B is, for example, preferably 10 wt % or more, more preferably 15 wt % or more, further preferably 25 wt % or more, and particularly preferably 30 wt % or more, with respect to 100 wt % of the polypropylene resin. Examples of the polypropylene resin B include isotactic polypropylene. In the present disclosure, an embodiment in which a ratio of a mass of the polypropylene resin A to a total mass of the polypropylene resin A and the polypropylene resin B is 55 mass % or more and 75 mass % or less is particularly preferable.

The Mw of the polypropylene resin B is preferably 300,000 or more, more preferably 350,000 or more, and even more preferably 360,000 or more. The Mw in the polypropylene resin B is preferably 550,000 or less, more preferably 450,000 or less, and further preferably 420,000 or less. When Mw is 300,000 or more and 550,000 or less, it is easy to control the thickness of a cast rolled sheet in the production process of the polypropylene film, and thickness unevenness is less likely to occur.

The Mn of the polypropylene resin B is preferably 40,000 or more and 54,000 or less, more preferably 42,000 or more and 50,000 or less, and further preferably 44,000 or more and 48,000 or less. When Mn is 40,000 or more and 54,000 or less, a capacitor element having excellent heat resistance is easily obtained.

The Mz of the polypropylene resin B is preferably more than 1,550,000 and 2,000,000 or less, and more preferably 1,580,000 or more and 1,900,000 or less. When Mz is more than 1,550,000 and 2,000,000 or less, a film having a high dielectric breakdown strength at high temperatures is easily obtained.

The molecular-weight distribution (Mw/Mn) of the polypropylene resin B is preferably 5.0 or more, more preferably 5.5 or more, further preferably 7.0 or more, even more preferably 7.5 or more, and particularly preferably 8.0 or more. The upper limit of Mw/Mn in the polypropylene resin B is, for example, 11.0 or less, preferably 10.0 or less, and more preferably 8.5 or less. When Mw/Mn is 5.0 or more and 11.0 or less, stretchability is improved, and a thin film is easily obtained.

The molecular-weight distribution (Mz/Mn) of the polypropylene resin B is preferably 30 or more and 40 or less and more preferably 33 or more and 36 or less. When Mz/Mn is 30 or more and 40 or less, stretchability is improved, and a thin film is easily obtained.

In the molecular-weight distribution curve of the polypropylene resin B, the differential distribution value when the logarithmic molecular weight Log(M) is 4.5 is preferably 24.0 or more and more preferably 27.0 or more. The upper limit value is preferably 35.0 or less and more preferably 32.0 or less. The differential distribution value when the logarithmic molecular weight Log(M) is 6.0 is preferably 28.0 or more and more preferably 30.0 or more. The upper limit value is preferably 35.0 or less and more preferably 33.0 or less. A difference obtained by subtracting a differential distribution value when the logarithmic molecular weight Log(M) is 6.0 from a differential distribution value when the logarithmic molecular weight Log(M) is 4.5 (difference in molecular weight differential values (DM)) is preferably −11.0 or more and 7.0 or less, more preferably −6.0 or more and 0.0 or less, and further preferably −4.0 or more and −2.0 or less.

When the polypropylene resin contains the polypropylene resins A and B described above, due to the differences in Mw, Mw/Mn, and differential distribution values between the polypropylene resins A and B, that is, the difference in the composition of the molecular-weight distribution, the polypropylene film obtained by mixing and molding has a slightly different quantitative relationship between the high-molecular-weight component and the low-molecular-weight component, so that it is considered preferable because it takes a certain kind of finely mixed (phase-separated) state and the crystal size is easily reduced. Even at the same stretching ratio, high orientation tends to be obtained, which is considered preferable because it is easy to obtain a finely roughened surface. When the polypropylene resin contains the polypropylene resins A and B, the present disclosure is considered to exhibit excellent effects for the reasons stated above; however, the present disclosure is not limited by those reasons.

The lower limit value of the weight proportion w of the polypropylene resin B is preferably 2.0% or more, more preferably 2.5% or more, and further preferably 3.0% or more. The upper limit value is preferably 5.0% or less and more preferably 4.2% or less. When the weight proportion w of the polypropylene resin B is within such a range, the weight proportion w after mixing the polypropylene resin A and the polypropylene resin B is 2.0% or more and 5.0% or less due to the combination with the weight proportion w of the polypropylene resin A described above, so that a polypropylene film having an excellent dielectric breakdown strength at high temperatures is easily obtained.

The melt flow rate (MFRB) in the polypropylene resin B at 230° C. is preferably 4.5 g/10 min or less, more preferably 4.0 g/10 min or less, further preferably 3.0 g/10 min or less, and even more preferably less than 2.8 g/10 min. The lower limit of MFRB is preferably 0.1 g/10 min or more, more preferably 0.5 g/10 min or more, and further preferably 1.5 g/10 min or more.

The difference MFRA−MFRB between the MFRA of the polypropylene resin A as the base resin of the main component and the MFRB of the polypropylene resin B as a blend resin is preferably set to 1.2 g/10 min or more. That is, MFRA is larger than MFRB. The difference MFRA−MFRB is preferably 1.3 g/10 min or more, more preferably 1.5 g/10 min or more, and further preferably 1.7 g/10 min or more. When the difference MFRA−MFRB is less than 1.2 g/10 min (the values less than 1.2 g/10 min include negative values), a sea-island phase-separated structure is not formed at the time point of molding a cast rolled sheet in the production process of the polypropylene film, or even if the sea-island phase-separated structure is formed, the island size is very small; thus, finally, a polypropylene film having an excellent dielectric breakdown strength at high temperatures may be less likely to be obtained. In particular, even when the difference between MFRA and MFRB is large, if MFRB is larger (if the difference MFRA−MFRB is negative), the island size of the sea-island phase-separated structure is very small.

In a preferred embodiment of the polypropylene film of the present disclosure, the polypropylene resin B can include an embodiment as follows:

Mw of the polypropylene resin B is 300,000 or more and 550,000 or less, a molecular-weight distribution (Mw/Mn) of the polypropylene resin B is 5.0 or more and 11.0 or less, and a melt flow rate (MFRB) of the polypropylene resin B is 0.1 g/10 min or more and 3.0 g/10 min or less. The use of the polypropylene resin B having such physical properties makes it easy to mold a cast sheet (stretch precursor) by an extruder.

In a more preferred embodiment of the polypropylene film of the present disclosure, the polypropylene resin B can include an embodiment as follows:

Mw of the polypropylene resin B is 350,000 or more and 400,000 or less, a molecular-weight distribution (Mw/Mn) of the polypropylene resin B is 7.8 or more and 8.8 or less, and a melt flow rate (MFRB) of the polypropylene resin B is 1.8 g/10 min or more and 2.8 g/10 min or less.

The heptane insoluble of the polypropylene resin B is preferably 97.5% or more, more preferably 98.0% or more, further preferably more than 98.5%, particularly preferably 98.6% or more. The heptane insoluble is preferably 99.5% or less and more preferably 99.0% or less.

The total ash content of the polypropylene resin B is preferably as small as possible because of electrical characteristics. The total ash content is preferably 50 ppm or less, more preferably 40 ppm or less, and further preferably 30 ppm or less, based on the polypropylene resin B. The lower limit of the total ash content is, for example, 2 ppm, 5 ppm, or the like.

Although the case where two or more polypropylene resins of the polypropylene resin A (base resin) and the polypropylene resin B (blend resin) are used has been illustratively described above, in the present disclosure, the polypropylene film can contain a resin other than the polypropylene resin. In that case, the total amount of the polypropylene resin A and the polypropylene resin B can be, for example, 90 wt % or more, 95 wt % or more, or 100 wt %, based on the entire resin, which is taken as 100 wt %. As described above, one of the polypropylene resins A may be a "base resin" and the other may be a "blend resin".

The polypropylene film of the present disclosure can further contain an additive. Examples of the additive include antioxidants, chlorine absorbers, ultraviolet absorbers, lubricants, plasticizers, flame-retardant agents, antistatic agents, and coloring agents.

The polypropylene film of the present disclosure may be a biaxially stretched film, a uniaxially stretched film, or an unstretched film, but is preferably a biaxially stretched film.

The polypropylene film of the present disclosure is preferably used for a capacitor, and specifically, can be suitably applied as a capacitor dielectric. As described below, the polypropylene film of the present disclosure can be formed as a metal layer-integrated polypropylene film having a metal layer laminated on one surface or both surfaces of the film, and a film capacitor can be produced by winding the metal layer-integrated polypropylene film or by laminating a plurality of the metal layer-integrated polypropylene films.

In consideration of the capacitor application described above, the polypropylene film of the present disclosure desirably has the following properties of dielectric breakdown strength and heat shrinkage resistance.

The dielectric breakdown strength at a direct current voltage at 100° C. (DCES100° C.) of the polypropylene film of the present disclosure is preferably 550 V/$\mu$m or more, more preferably 560 V/$\mu$m or more, and further preferably 570 V/$\mu$m or more. The upper limit of the dielectric breakdown strength at a direct current voltage at 120° C. is preferably higher, and is, for example, 600 V/$\mu$m, 590 V/$\mu$m, or the like.

The dielectric breakdown strength at a direct current voltage at 120° C. (DCES120° C.) of the polypropylene film of the present disclosure is preferably 530 V/$\mu$m or more, more preferably 535 V/$\mu$m or more, further preferably 540 V/$\mu$m or more, and particularly preferably 545 V/$\mu$m or more. The upper limit of the dielectric breakdown strength at a direct current voltage at 120° C. is preferably higher, and is, for example, 560 V/$\mu$m, 555 V/$\mu$m, or the like.

The volume resistivity (5 minute value) of the polypropylene film of the present disclosure is preferably $2\times10^{15}$ $\Omega$·m or more and $4\times10^{15}$ $\Omega$·m or less. The volume resistivity (10 minute value) of the polypropylene film of the present disclosure is preferably $2\times10^{15}$ $\Omega$·m or more and $4\times10^{15}$ $\Omega$·m or less. The method for measuring the volume resistivity (5 minute value and 10 minute value) of the polypropylene film in the present specification is as described in Examples

Method for Producing Polypropylene Film

The method for producing the polypropylene film of the present disclosure is not limited, but for example, the polypropylene film of the present disclosure can be suitably produced by adopting the following production method (hereinafter, referred to as "the method for producing the polypropylene film of the present disclosure").

The method for producing the polypropylene film of the present disclosure is a method for producing the above-described polypropylene film of the present disclosure, including a step of melting a polypropylene resin composition containing at least a polypropylene resin A and a polypropylene resin B at a temperature of 225° C. or higher and 270° C. or lower and a shear rate of 2000 s$^{-1}$ or more and 15000 s$^{-1}$ or less, in which a difference MFRA−MFRB between a melt flow rate (MFRA) of the polypropylene resin A and (MFRB) of the polypropylene resin B is 1.2 g/10 min or more, and a content of the polypropylene resin A in the polypropylene resin composition is larger than a content of the polypropylene resin B in the polypropylene resin composition.

According to the production method, it is possible to provide a polypropylene film having a good dielectric breakdown strength at high temperatures. The reason for this is considered to be due to the sea-island phase-separated structure (particularly, the appropriate island size) of the cast rolled sheet by using two different polypropylene resins.

In the method for producing the polypropylene film of the present disclosure, the polypropylene resin composition containing at least a polypropylene resin A and a polypropylene resin B is used. The larger content of the polypropylene resin A in the polypropylene resin composition than the content of the polypropylene resin B in the polypropylene resin composition means that in the relationship between the polypropylene resin A and the polypropylene resin B, the polypropylene resin A is a base resin of a main component, and the polypropylene resin B is a blend resin for the base resin. The terms "polypropylene resin A" and "polypropylene resin B" in the method for producing the polypropylene film of the present disclosure correspond, respectively, to the terms "polypropylene resin A" and "polypropylene resin B" in the section of polypropylene film described above, and explanations of the Mw, Mn, Mz, molecular-weight distribution (Mw/Mn), molecular-weight distribution (Mz/Mn), differential distribution value when the logarithmic molecular weight Log(M) is 4.5, differential distribution value when the logarithmic molecular weight Log(M) is 6.0, difference in molecular weight differential values (DM), weight proportion w, and MFR of each resin are as described above; however, in the method for producing the polypropylene resin of the present disclosure, those in which the difference MFRA−MFRB between MFRA and MFRB is 1.2 g/10 min or more are particularly used.

The method for mixing the resins applied to the production method of the present disclosure is not particularly limited, and examples thereof include a method of dry-blending a polymer powder or pellets of the base resin and the blend resin using a mixer or the like, and a method of supplying a polymer powder or pellets of the base resin and the blend resin to a kneader, followed by melting and kneading to thereby obtain a kneaded product.

The mixer and kneader are not particularly limited. The kneader may be any of a single-screw type kneader, a two-screw type kneader, or a multi-screw type kneader having three or more screws. When a kneader having two or more screws is used, the type of kneading may be rotation in the same direction or different directions.

In the case of kneading by melting and kneading, the kneading temperature is not particularly limited as long as a good kneaded product is obtained. The temperature is generally in a range of 200° C. or higher and 300° C. or lower, and preferably 230° C. or higher and 270° C. or lower from the viewpoint of suppressing resin degradation. In order to suppress resin degradation during kneading and mixing, the kneader may be purged with an inert gas such as nitrogen. The molten-kneaded resin may be pelletized into a suitable size using a commonly known pelletizer. As a result, mixed polypropylene raw material resin pellets can be obtained.

The total ash content derived from polymerization catalyst residues and the like contained in the polypropylene raw material resin is preferably as low as possible in order to improve electrical characteristics. The total ash content is preferably 50 ppm or less, more preferably 40 ppm or less, and particularly preferably 30 ppm or less, based on the polypropylene resin (100 parts by weight).

The polypropylene resin may contain an additive. The "additive" is generally an additive used for a polypropylene resin, and is not particularly limited as long as a polypropylene film can be obtained. Examples of the additive include antioxidants, chlorine absorbers, ultraviolet absorbers, lubricants, plasticizers, flame-retardant agents, and antistatic agents. The polypropylene resin may contain the additive in such an amount that does not adversely affect the polypropylene film.

In the method for producing the polypropylene film of the present disclosure, first, polypropylene resin pellets, dry-mixed polypropylene resin pellets, or mixed polypropylene resin pellets prepared by melt-kneading in advance are supplied to an extruder, and heated and melted.

The polypropylene resin composition is allowed to melt at 225° C. or higher and 270° C. or lower. Specifically, the set temperature of the extruder is set to 225° C. or higher and 270° C. or lower during heat-melting of the polypropylene resin composition. As a result, on the assumption that the specific polypropylene resin composition is used, a sea-island phase-separated structure is formed at the time point of molding a cast rolled sheet described below, and a polypropylene film having an excellent dielectric breakdown strength at high temperatures is finally obtained.

The polypropylene resin composition is melted at a shear rate of 2000 $s^{-1}$ or more and 15000 $s^{-1}$ or less while maintaining the composition at a temperature of 225° C. or higher and 270° C. or lower. As a result, on the assumption that the specific polypropylene resin composition is used, a sea-island phase-separated structure is formed at the time point of molding a cast rolled sheet described below, and a polypropylene film having an excellent dielectric breakdown strength at high temperatures is finally obtained. When the shear rate is less than 2000 $s^{-1}$, the extrusion amount is not constant, the shape and dimensions of the cast rolled sheet become irregular or fluctuate regularly, and breakage during transportation of the cast rolled sheet and breakage during stretching are likely to occur.

When the shear rate exceeds 15000 $s^{-1}$, unmelted materials are extruded in the extruder by a phenomenon called "breakup", and a uniform cast rolled sheet cannot be obtained, which tends to lead to breakage during stretching, or excessive heat is generated when passing through the tip clearance, and the polypropylene resin composition is significantly deteriorated, so that even when a uniform cast rolled sheet is obtained, the film obtained by stretching has lowered dielectric breakdown strength. The shear rate can be adjusted by adjusting the cylinder diameter and screw rotation speed of the extruder and the groove depth of the screw.

The shear rate may be 2000 $s^{-1}$ or more and 15000 $s^{-1}$ or less, but is preferably 2000 $s^{-1}$ or more and 10000 $s^{-1}$ or less, and more preferably 2000 $s^{-1}$ or more and 2300 $s^{-1}$ or less. When the shear rate is within such a range, a polypropylene film having a weight proportion w of 2.6% or more and 4.0% or less is easily obtained, and due to the combination with other requirements, a film capacitor using the polypropylene film as a capacitor derivative has excellent heat resistance.

Next, the molten resin composition is extruded into a sheet using a T-die, and cooled and solidified by at least one or more metal drums to form an unstretched cast rolled sheet. The surface temperature of the metal drum (the temperature of the metal drum with which the extruded sheet first comes into contact) is preferably 50° C. or higher and 105° C. or lower and more preferably 60° C. or higher and 100° C. or lower. The surface temperature of the metal drum can be determined depending on the physical properties and the like of the polypropylene resin used. When the surface temperature of the metal drum is significantly lower than 50° C., the cast rolled sheet is less likely to achieve good sheet moldability, which makes it difficult to obtain a polypropylene film well without stretching unevenness or breakage during stretching film formation.

The thickness of the cast rolled sheet is not particularly limited as long as the polypropylene film can be obtained, and is usually preferably 0.05 mm or more and 2 mm or less and more preferably 0.1 mm or more and 1 mm or less.

The polypropylene film can be produced by stretching the polypropylene cast rolled sheet. Stretching is preferably biaxial stretching that causes orientation along longitudinal and lateral axes, and the stretching method is preferably a sequential biaxial stretching method. In the sequential biaxial stretching method, for example, the cast rolled sheet is first maintained at a temperature of 110° C. or higher and 170° C. or lower (preferably 135° C. or higher and 170° C. or lower), and stretched in the flow direction by passing the sheet between rolls having different speeds. The stretching ratio in the flow direction is preferably 3.5 times or more and 5.5 times or less and more preferably 4.2 times or more and 5.4 times or less. Subsequently, the sheet is guided to a tenter and stretched in the lateral direction. The temperature during stretching in the lateral direction is preferably 150° C. or higher and 165° C. or lower, and the stretching ratio in the lateral direction is preferably 9 times or more and 11 times or less. Thereafter, the sheet is relaxed at a factor of 2 or more and 10 or less and solidified by heat. Through the above processes, a biaxially stretched polypropylene film is obtained.

The thickness of the polypropylene film is preferably 0.8 μm or more and 6.0 μm or less as described above from the viewpoint of ensuring a decrease in size and an increase in capacitance of a capacitor when the polypropylene film is used for a capacitor. Specifically, the thickness of the polypropylene film is preferably 5.5 μm or less, more preferably 3.5 μm or less, further preferably 3.0 μm or less, and particularly preferably 2.4 μm or less. The thickness of the polypropylene film is preferably 1.0 μm or more, more preferably 1.8 μm or more, and further preferably 2.2 μm or more, in terms of production.

The polypropylene film may be subjected to a corona discharge treatment online or offline after completion of the stretching and thermal solidification step, for the purpose of enhancing adhesive properties in a subsequent step such as a metal deposition processing step. The corona discharge treatment can be performed by a known method. The treatment is preferably performed in an atmospheric gas such as air, carbon dioxide gas, nitrogen gas, or a mixed gas thereof.

In the polypropylene film of the present disclosure obtained in the above manner, even when the thickness of the film is as thin as 6.0 μm or less, the film has an excellent dielectric breakdown strength when a direct current voltage is applied at a high temperature of about 120° C. (100° C. to 120° C.) and an excellent dielectric breakdown strength when an alternating current voltage is applied, and excellent heat shrinkage resistance in terms of suppressing heat shrinkage in the machine direction (MD) at temperatures up to about 150° C. exceeding the above high temperature. The film capacitor of the present disclosure, which uses the polypropylene film as a capacitor derivative, has excellent heat resistance at a high temperature of about 120° C. (100° C. to 120° C.), and specifically, the film capacitor of the present disclosure has excellent lifetime performance in terms of suppressing a decrease in capacitance of the capacitor even after use for a long period of time at the above high temperature, and has excellent thermal shock resistance in terms of suppressing heat tightening (deformation) of the capacitor in repeated use between the above high temperature, assuming inside an engine room, and a low temperature. Therefore, the polypropylene film of the present disclosure is suitable for use in a film capacitor, and can be preferably used as a capacitor derivative constituting an inverter in a hybrid car or an electric car.

Metal Layer-Integrated Polypropylene Film Capacitor and Production Method Therefor The polypropylene film of the present disclosure may be formed as a metal layer-integrated polypropylene film having a polypropylene film and a metal layer laminated on one surface or both surfaces of the polypropylene film, in consideration of processing to capacitors.

The metal layer functions as an electrode. As the metal used in the metal layer, for example, single metals such as zinc, lead, silver, chromium, aluminum, copper, and nickel, mixtures of several kinds of these metals, alloys thereof, and the like can be used, but zinc and aluminum are preferable in consideration of environment, economical efficiency, capacitor performance, and the like.

Examples of the method for laminating a metal layer on one surface or both surfaces of the polypropylene film include a vacuum deposition method and a sputtering method. From the viewpoint of productivity, economical efficiency, and the like, a vacuum deposition method is preferable. General examples of the vacuum deposition method include a crucible method and a wire method, but the method is not particularly limited, and an optimal method can be appropriately selected.

A margin pattern when the metal layer is laminated by deposition is not particularly limited, but in terms of improving capacitor properties such as safety, it is preferable that a pattern including a so-called special margin, such as a fishnet pattern or T-margin pattern, is applied to one surface of the polypropylene film. This is also effective from the viewpoints of enhancing safety, preventing breakdown and short-circuit of the capacitor, and the like.

As a method for forming a margin, a generally known method such as a tape method or an oil method can be used without any limitation.

The metal layer-integrated polypropylene film of the present disclosure can be laminated or wound by a conventionally known method to form a film capacitor.

In the film capacitor of the present disclosure, the insulation resistance value at an ambient temperature of 115° C. is preferably 20 MΩ·μF or more. The condition of the insulation resistance is, for example, 200 MΩ·μF or less.

The insulation resistance value is defined by the product (CIR product) of the nominal capacitance value of the capacitor and the insulation resistance.

That is, the film capacitor may have a configuration in which a plurality of the metal layer-integrated polypropylene films are laminated or may have the wound metal layer-integrated polypropylene film. Such a film capacitor can be suitably used as a capacitor for an inverter power supply device that controls a drive motor of an electric car, a hybrid car, or the like. In addition, the film capacitor can also be suitably used for railroad vehicles, wind power generation, solar power generation, general household appliances, and the like.

EXAMPLES

Hereinafter, the present disclosure will be specifically described with reference to Examples and Comparative Examples. However, the present disclosure is not limited to Examples.

Resin

Details of resins (PP resins A1 to A7 and PP resins B1 to B8) used in Examples and Comparative Examples are summarized in Table 1 below and methods for measuring respective physical properties are described.

TABLE 1

| | Mn ×10000 | Mw ×10000 | Mz ×10000 | Mw/Mn | Mz/Mn | Value using differential molecular-weight distribution | | |
| | | | | | | Log (M) = 4.5 | Log (M) = 6.0 | DM "4.5" − "6.0" |
|---|---|---|---|---|---|---|---|---|
| PP resin A1 | 4.2 | 34 | 150 | 8.1 | 35.7 | 31.4 | 26.6 | 4.8 |
| PP resin A2 | 3.3 | 31 | 140 | 9.4 | 42.4 | 33.5 | 24.5 | 9.0 |
| PP resin A3 | 4.7 | 27 | 75 | 5.7 | 16.0 | 29.9 | 21.4 | 8.6 |
| PP resin A4 | 3.4 | 34 | 155 | 10.0 | 45.5 | 35.0 | 24.8 | 10.2 |
| PP resin A5 | 3.6 | 31 | 120 | 8.6 | 33.3 | 34.0 | 23.0 | 11.0 |
| PP resin A6 | 4.7 | 27 | 75 | 5.7 | 16.0 | 30.2 | 21.2 | 10.0 |
| PP resin A7 | 4.7 | 27 | 75 | 5.7 | 16.0 | 30.0 | 21.2 | 8.8 |
| PP resin B1 | 4.6 | 38 | 160 | 8.3 | 34.8 | 27.3 | 30.9 | −3.6 |
| PP resin B2 | 7.6 | 46 | 190 | 6.1 | 25.0 | 20.8 | 37.1 | −16.3 |
| PP resin B3 | 4.2 | 32 | 120 | 7.6 | 28.6 | 32.0 | 25.4 | 6.6 |
| PP resin B4 | 4.6 | 39 | 160 | 8.5 | 34.8 | 27.3 | 30.9 | −3.6 |
| PP resin B5 | 4.4 | 35 | 150 | 8.0 | 34.8 | 32.3 | 25.3 | 7.0 |
| PP resin B6 | 4.5 | 34 | 130 | 7.6 | 28.9 | 31.3 | 27.7 | 3.6 |

TABLE 1-continued

| | | | | | | | | |
|---|---|---|---|---|---|---|---|---|
| PP resin B7 | 4.6 | 38 | 160 | 8.3 | 34.8 | 27.4 | 30.8 | −3.4 |
| PP resin B8 | 4.6 | 38 | 160 | 8.3 | 34.8 | 27.4 | 30.8 | −3.4 |

| | Weight proportion w % | HI % | MFR g/10 min | Manufacturer |
|---|---|---|---|---|
| PP resin A1 | 4.5 | 98.5 | 4.0 | Borealis AG |
| PP resin A2 | 6.4 | 97.3 | 4.9 | Prime Polymer Co., Ltd. |
| PP resin A3 | 4.1 | 97.8 | 5.6 | Prime Polymer Co., Ltd. |
| PP resin A4 | 6.2 | 97.3 | 4.5 | Prime Polymer Co., Ltd. |
| PP resin A5 | 6.0 | 97.2 | 4.6 | Prime Polymer Co., Ltd. |
| PP resin A6 | 4.3 | 97.7 | 5.6 | Prime Polymer Co., Ltd. |
| PP resin A7 | 4.3 | 97.8 | 5.5 | Prime Polymer Co., Ltd. |
| PP resin B1 | 3.3 | 98.8 | 2.3 | Korea Petrochemical Ind. Co., LTD. |
| PP resin B2 | 2.0 | 98.9 | 0.7 | Korea Petrochemical Ind. Co., LTD. |
| PP resin B3 | 4.6 | 98.5 | 3.0 | Samsung Total Petrochemicals Co., Ltd. |
| PP resin B4 | 3.7 | 98.8 | 2.1 | Korea Petrochemical Ind. Co., LTD. |
| PP resin B5 | 4.6 | 98.6 | 3.0 | Korea Petrochemical Ind. Co., LTD. |
| PP resin B6 | 4.5 | 98.6 | 3.1 | Korea Petrochemical Ind. Co., LTD. |
| PP resin B7 | 3.8 | 98.7 | 2.3 | Korea Petrochemical Ind. Co., LTD. |
| PP resin B8 | 3.8 | 98.8 | 2.1 | Korea Petrochemical Ind. Co., LTD. |

PP resin A1: manufactured by Borealis AG
PP resins A2 to A7: manufactured by Prime Polymer Co., Ltd.
PP resin B1: manufactured by Korea Petrochemical Ind. Co., LTD.
PP resin B2: trade name "S800" manufactured by Korea Petrochemical Ind. Co., LTD.
PP resin B3: trade name "HU300" manufactured by Samsung Total Petrochemicals Co., Ltd.
PP resin B4: manufactured by Korea Petrochemical Ind. Co., LTD.
PP resin B5: manufactured by Korea Petrochemical Ind. Co., LTD.
PP resin B6: manufactured by Korea Petrochemical Ind. Co., LTD.
PP resin B7: manufactured by Korea Petrochemical Ind. Co., LTD.
PP resin B8: manufactured by Korea Petrochemical Ind. Co., LTD.

Measurement of Number-Average Molecular Weight (Mn), Weight-Average Molecular Weight (Mw), z-Average Molecular Weight (Mz), Molecular-Weight Distribution (Mw/Mn), Molecular-Weight Distribution (Mz/Mn), and Weight Proportion w of Polypropylene Resin First, the average molecular weight and molecular-weight distribution of each polypropylene resin were measured by size exclusion chromatography (SEC) under the following conditions.

Device: HLC-8321GPC/HT (detector: differential refractometer (RI)) (manufactured by Tosoh Corporation)

Column: one TSKgel guardcolumn HHR(30)HT column (7.5 mm I.D.×7.5 cm)+three TSKgel GMHHR-H(20) HT (7.8 mm I.D.×30 cm) columns (manufactured by Tosoh Corporation)

Eluent: 1,2,4-trichlorobenzene (for GPC, manufactured by FUJIFILM Wako Pure Chemical Corporation)+BHT (0.05%)

Flow rate: 1.0 mL/min

Detection condition: polarity-(−)

Injected amount: 0.3 mL

Column temperature: 140° C.

System temperature: 40° C.

Sample concentration: 1 mg/mL

Sample pretreatment: A sample was weighed, a solvent (1,2,4-trichlorobenzene added with 0.1% BHT) was added, and the sample was dissolved by shaking at 140° C. for 1 hour. Thereafter, the resultant was heated and filtered through a 0.5-µm sintered filter.

Calibration curve: A calibration curve of the fifth-order approximate curve was prepared using polystyrene standard manufactured by Tosoh Corporation. However, the molecular weight was converted into the molecular weight of polypropylene using the Q-factor.

From the obtained calibration curve and SEC chromatogram, analysis software for the measurement device was used to plot the molecular weight (logarithmic values) on the horizontal axis and the integral value of the concentration fraction on the vertical axis, thereby obtaining an integral molecular-weight distribution curve. A differential value of the integral molecular-weight distribution curve (slope of the integral molecular-weight distribution curve) at each molecular weight was determined, and a differential molecular-weight distribution curve was obtained by plotting the molecular weight (logarithmic values) on the horizontal axis and the differential value on the vertical axis.

From these curves, the number-average molecular weight Mn, the weight-average molecular weight Mw, and the Z-average molecular weight Mz were obtained. The Mw and Mn values were used to obtain a molecular-weight distribution (Mw/Mn). A value when the logarithmic molecular weight Log(M) is 4.0 in the integral molecular-weight distribution curve was designated as the weight proportion w. The weight proportion w indicates the weight proportion of a molecule at a logarithmic molecular weight Log(M) of 4.0, that is, a molecular weight of 10,000 or less.

Measurement of Differential Distribution Value when Logarithmic Molecular Weight Log(M) is 4.5, Differential Distribution Value when Logarithmic Molecular Weight Log(M) is 6.0, and Difference in Molecular Weight Differential Values (DM)

For each polypropylene resin, the differential distribution value when the logarithmic molecular weight Log(M) is 4.5 and the differential distribution value when the logarithmic molecular weight Log(M) is 6.0 were obtained by the following method. First, a time curve (elution curve) of intensity distribution detected by an RI detector was converted into a distribution curve with respect to the molecular weight M (Log(M)) of the above polystyrene standard using the calibration curve produced using the polystyrene standard. Next, after an integral distribution curve with respect to Log(M) when the total area of the distribution curve was regarded as 100% was obtained, the integral distribution curve was differentiated by Log(M), thereby obtaining a differential distribution curve with respect to Log(M). Differential distribution values when Log(M) is 4.5 and Log(M) is 6.0 were read from this differential distribution curve. A difference between the differential distribution value when Log(M) is 4.5 and the differential distribution value when Log(M) is 6.0 was designated as the difference in molecular weight differential values (DM). The series of operations until the differential distribution curve was obtained was performed using analysis software provided in the GPC measurement apparatus.

Measurement of Heptane Insoluble (HI)

Each polypropylene resin was press-molded to 10 mm×35 mm×0.3 mm to prepare about 3 g of a measurement sample. Next, about 150 mL of heptane was added, and Soxhlet extraction was performed for 8 hours. The heptane insoluble was calculated from the sample mass before and after extraction.

Measurement of Melt Flow Rate (MFR)

The melt flow rate (MFR) in the form of raw material resin pellets used in the Examples and Comparative Examples was measured using the melt index of Toyo Seiki Co., Ltd. according to the condition M of JIS K 7210. Specifically, first, a sample weighed to 4 g was inserted into a cylinder set at a test temperature of 230° C., and preheated under a load of 2.16 kg for 3.5 minutes. Thereafter, the weight of the sample extruded from the bottom hole for 30 seconds was measured, and MFR (unit: g/10 min) was determined. The above measurements were repeated 3 times, and the average value was taken as the measured value of MFR.

Examples 1 to 6 and Comparative Examples 1 to 15

Production of Biaxially Stretched Polypropylene Film and Evaluation of Properties Thereof According to Table 2, the polypropylene resins A and B were weighed and mixed at the weight ratios shown in Table 2, thereby obtaining dry-blended resin compositions. Next, each dry-blended resin composition was supplied to an extruder and melted at the melting temperature and shear rate shown in Table 2. This molten resin was extruded using a T-die, wound around a metal drum whose surface temperature was maintained at 95° C. and solidified to produce a cast rolled sheet. The unstretched cast rolled sheet was maintained at a temperature of 140° C., passed between rolls having different speeds, stretched by a factor of 4.5 in the flow direction, and immediately cooled to room temperature. Subsequently, after the stretched film obtained by stretching in the flow direction was guided to a tenter and stretched by a factor of 10 in the width direction at a traverse stretching temperature of 158° C., relaxation at a relaxation rate of 12% and thermal solidification were performed, and then the biaxially stretched polypropylene film with a width of about 5 m and a thickness of 2.3 μm was wound around an iron core with a diameter of 400 mm by about 80,000 m under the atmosphere shown in Table 2 and wound as a jumbo roll. The wound biaxially stretched polypropylene film was subjected to an aging treatment in an atmosphere of 35° C. for 24 hours.

TABLE 2

| | Raw material | | | | Production conditions | | Film physical properties | | | |
|---|---|---|---|---|---|---|---|---|---|---|
| | Base resin | Number of parts Parts | Blend resin | Number of parts Parts | Melting temperature ° C. | Shear rate s$^{-1}$ | Thickness μm | Mz × 10000 | Mw/Mn | Weight proportion w % |
| Example 1 | Resin A1 | 65 | Resin B1 | 35 | 250 | 2000 | 2.3 | 110 | 6.3 | 3.5 |
| Example 2 | Resin A1 | 70 | Resin B1 | 30 | 250 | 2000 | 2.3 | 110 | 6.9 | 3.9 |
| Example 3 | Resin A1 | 55 | Resin B1 | 45 | 250 | 2000 | 2.3 | 111 | 6.7 | 3.8 |
| Example 4 | Resin A2 | 70 | Resin A1 | 30 | 250 | 2000 | 2.3 | 104 | 6.6 | 4.0 |
| Example 5 | Resin A1 | 60 | Resin B1 | 40 | 260 | 5000 | 2.3 | 110 | 6.4 | 3.7 |
| Example 6 | Resin A1 | 75 | Resin B1 | 25 | 230 | 2000 | 2.3 | 106 | 6.8 | 3.9 |
| Comparative Example 1 | Resin A1 | 95 | Resin B1 | 5 | 250 | 2000 | 2.3 | 108 | 8.0 | 4.1 |
| Comparative Example 2 | Resin B1 | 90 | Resin A1 | 10 | 250 | 2000 | 2.3 | 114 | 8.0 | 3.5 |
| Comparative Example 3 | Resin A2 | 65 | Resin B1 | 35 | 250 | 2000 | 2.3 | 100 | 6.7 | 4.9 |
| Comparative Example 4 | Resin A3 | 75 | Resin B1 | 25 | 250 | 2000 | 2.3 | 72 | 5.2 | 3.6 |
| Comparative Example 5 | Resin B3 | 100 | — | — | 250 | 2000 | 2.3 | 118 | 7.6 | 4.6 |
| Comparative Example 6 | Resin B2 | 100 | — | — | 250 | 2000 | Unstretchable | 180 | 6.1 | 2.0 |
| Comparative Example 7 | Resin A1 | 80 | Resin B7 | 20 | 230 | 2000 | 2.3 | 100 | 7.0 | 4.0 |
| Comparative Example 8 | Resin A1 | 75 | Resin B1 | 25 | 250 | 16000 | 2.3 | 100 | 6.8 | 4.1 |
| Comparative Example 9 | Resin A1 | 70 | Resin B1 | 30 | 290 | 2000 | 2.3 | 100 | 7.0 | 4.2 |
| Comparative Example 10 | Resin A2 | 65 | Resin B2 | 35 | 250 | 2000 | 2.3 | 120 | 8.7 | 4.2 |
| Comparative Example 11 | Resin A2 | 65 | Resin B4 | 35 | 250 | 2000 | 2.3 | 100 | 6.7 | 4.9 |
| Comparative Example 12 | Resin A4 | 65 | Resin B5 | 35 | 250 | 2000 | 2.3 | 101 | 7.8 | 5.9 |

TABLE 2-continued

| Comparative Example 13 | Resin A5 | 65 | Resin B6 | 35 | 250 | 2000 | 2.3 | 98 | 7.3 | 6.0 |
| Comparative Example 14 | Resin A6 | 75 | Resin B7 | 25 | 250 | 1800 | 2.3 | 70 | 6.4 | 4.3 |
| Comparative Example 15 | Resin A7 | 75 | Resin B8 | 25 | 260 | 1800 | 2.3 | 70 | 6.4 | 4.3 |

| | Film physical properties | | | | | Element physical properties | | |
| | | | | Volume resistivity | | | | Element- |
| | DCES 100° C. V/μm | DCES 120° C. V/μm | Density kg/m$^3$ | 5 minute value Ω·cm | 10 minute value Ω·cm | Lifetime | Deposition processability | winding processability |
| --- | --- | --- | --- | --- | --- | --- | --- | --- |
| Example 1 | 587 | 547 | 922 | $3 \times 10^{15}$ | $3 \times 10^{15}$ | ○ | ○ | ○ |
| Example 2 | 582 | 541 | 922 | $3 \times 10^{15}$ | $3 \times 10^{15}$ | ○ | ○ | ○ |
| Example 3 | 577 | 535 | 922 | $3 \times 10^{15}$ | $3 \times 10^{15}$ | ○ | ○ | ○ |
| Example 4 | 574 | 534 | 921 | $2 \times 10^{15}$ | $3 \times 10^{15}$ | ○ | ○ | ○ |
| Example 5 | 582 | 544 | 922 | $3 \times 10^{15}$ | $3 \times 10^{15}$ | ○ | ○ | ○ |
| Example 6 | 580 | 535 | 922 | $3 \times 10^{15}$ | $3 \times 10^{15}$ | ○ | ○ | ○ |
| Comparative Example 1 | 566 | 527 | 919 | $2 \times 10^{15}$ | $2 \times 10^{15}$ | X | ○ | ○ |
| Comparative Example 2 | 556 | 518 | 922 | $1 \times 10^{15}$ | $1 \times 10^{15}$ | X | ○ | ○ |
| Comparative Example 3 | 580 | 528 | 919 | $2 \times 10^{15}$ | $2 \times 10^{15}$ | X | ○ | ○ |
| Comparative Example 4 | 565 | 529 | 922 | $1 \times 10^{15}$ | $2 \times 10^{15}$ | Δ | ○ | ○ |
| Comparative Example 5 | 555 | 503 | 913 | $1 \times 10^{14}$ | $1 \times 10^{14}$ | X | ○ | ○ |
| Comparative Example 6 | — | — | — | — | — | — | ○ | ○ |
| Comparative Example 7 | 573 | 534 | 922 | $2 \times 10^{15}$ | $2 \times 10^{15}$ | Δ | ○ | ○ |
| Comparative Example 8 | 575 | 535 | 922 | $2 \times 10^{15}$ | $2 \times 10^{15}$ | Δ | ○ | ○ |
| Comparative Example 9 | 575 | 536 | 922 | $2 \times 10^{15}$ | $2 \times 10^{15}$ | Δ | ○ | ○ |
| Comparative Example 10 | 560 | 491 | 922 | $1 \times 10^{15}$ | $2 \times 10^{15}$ | ○ | ○ | ○ |
| Comparative Example 11 | 566 | 530 | 919 | $2 \times 10^{15}$ | $2 \times 10^{15}$ | ○ | ○ | ○ |
| Comparative Example 12 | 551 | 521 | 919 | $2 \times 10^{15}$ | $2 \times 10^{15}$ | Δ | ○ | ○ |
| Comparative Example 13 | 551 | 518 | 919 | $2 \times 10^{15}$ | $2 \times 10^{15}$ | Δ | ○ | ○ |
| Comparative Example 14 | 547 | 516 | 920 | $1 \times 10^{15}$ | $2 \times 10^{15}$ | Δ | ○ | ○ |
| Comparative Example 15 | 547 | 515 | 920 | $1 \times 10^{15}$ | $2 \times 10^{15}$ | Δ | ○ | ○ |

In the film physical properties described in Table 2, the Mz of Comparative Example 5 using Resin 3 as a base resin is 1,180,000, the Mz of Comparative Example 6 using Resin 2 is 1,800,000, whereas the Mz of Resin 3 described in Table 1 is 1,200,000, the Mz of Resin 2 is 1,900,000, and the values of Mz in the film physical properties are slightly small. This is considered to mean that a high-molecular-weight component is decomposed by melting or the like when a film is produced using a polypropylene resin.

The methods for measuring the thickness, density, and dielectric breakdown strength of the biaxially stretched polypropylene film obtained in each of Examples and Comparative Examples, the method for performing thermomechanical analysis (TMA), and the method for evaluating the winding quality (wrinkles) of the jumbo rolls during aging are shown below. The results of each measurement and evaluation are also shown in Table 2.

Measurement of Polypropylene Film Thickness

A paper thickness measuring instrument MEI-11 (measurement pressure: 100 kPa, descent speed: 3 mm/sec, measuring terminal φ=16 mm, measuring force: 20.1 N) manufactured by Citizen Seimitsu Co., Ltd. was used in an environment of a temperature 23±2° C. and a humidity 50±5% RH. The sample was cut out from the roll with 10 or more sheets stacked, and handled so that wrinkles or air did not enter the film during cutting. The thickness of the 10 stacked samples was measured 5 times, and the average value of the 5 measurements was divided by 10 to calculate the thickness.

Measurement of Polypropylene Film Density

The density of the polypropylene films was measured according to Method D in JIS K7112 (1999).

Measurement device: density gradient tube-type specific gravity measuring device, Type A, manufactured by SHIBAYAMA SCIENTIFIC CO., LTD.

Gradient liquid: ethanol aqueous solution

Measurement temperature: 23±0.5° C.

Number of measurements: n=3

US 12,590,195 B2

23

Measurement of Dielectric Breakdown Strength of
Polypropylene Film: Direct Current (DC)

The dielectric breakdown voltage (BDV) of the polypro-
pylene film at 100° C. or 120° C. was measured 16 times
under the following test conditions with the electrode con-
figuration described in 17.2.2 (Plate electrode method) of
JIS C2151 (2006). The applied voltage at the time when the
leakage current of the following upper limit reference value
was detected during the pressure rise was defined as BDV.
BDV was divided by the thickness (μm) of the film, and the
average value of 12 points excluding the upper 2 points and
the lower 2 points in the 16 measurement results was taken
as the dielectric breakdown strength DCES (V/μm).

Specimen: about 150 mm×150 mm
Specimen condition adjustment: 30 minutes under atmo-
spheric conditions
Power source: direct current
Atmosphere: in the air, 100° C. or 120° C.
Tester: DC withstanding voltage/insulation resistance tes-
ter TOS9213AS manufactured by KIKUSUI ELEC-
TRONICS CORPORATION
Voltage rise rate: 100 V/s
Current detection response speed: MID
Upper limit reference value: 5 mA Volume Resistivity Measurement of Volume Resistivity ρV A specific measurement procedure of the volume resis-
tivity is described below, but as for conditions not specifi-
cally described, the volume resistivity was measured as
follows based on JIS C 2139-3-1:2018

First, a jig for measuring volume resistivity (hereinafter,
also simply referred to as a jig) was placed in a thermostatic
chamber in an environment of 100° C. The configuration of
the jig is as follows. A DC power supply and a DC ammeter
were connected to the jig.

Jig for Measuring Volume Resistivity

Main electrode (diameter: 50 mm)
Counter electrode (diameter: 85 mm)
Annular guard electrode surrounding main electrode
(outer diameter: 80 mm, inner diameter: 70 mm)
Each electrode is made of gold-plated copper, and a
conductive rubber is attached to a surface in contact with a
sample. The conductive rubber used is EC-60BL (W300)
manufactured by Shin-Etsu Silicone Co., Ltd., and the
conductive rubber is attached so that the glossy surface of
the conductive rubber is in contact with the gold-plated
copper.

Next, the resin films (hereinafter, also referred to as
samples) of Examples and Comparative Examples were set
in the jig in the thermostatic chamber. Specifically, the main
electrode and the guard electrode were brought into close
contact with one surface of the sample, the counter electrode
was brought into close contact with the other surface, and
the sample and each electrode were brought into close
contact with each other at a load of 5 kgf. Thereafter, the
obtained product was left to stand still for 30 minutes.

Next, a voltage was applied to the sample so that the
potential gradient was 200 V/μm.

The current values at 5 minutes and 10 minutes after the
application of the voltage were read, and the volume resis-
tivity was calculated by the following equation. For the voltage application and current value measurement, 6517B
(electrometer/insulation resistance meter) manufactured by
Keithley was used.

Volume resistivity=[(Effective electrode area)×(Ap-
plied voltage)]/[(Thickness of sample)×(Current
value)]

The effective electrode area was determined by the fol-
lowing equation.

(Effective electrode area)=Ratio of circumference of
circle to its diameter×[[[(Diameter of main elec-
trode)+(Inner diameter of guard electrode)]/2]/
2]²

This was repeated three times, and the arithmetic average
value obtained in one significant digit was taken as the
volume resistivity (SI cm).

Production of Film Capacitor and Evaluation of
Properties Thereof

The biaxially stretched polypropylene film obtained in
each of Examples and Comparative Examples was used to
produce a film capacitor by the following procedure.

A special deposition pattern margin and an insulation
margin for imparting the film capacitor safety were formed
on the biaxially stretched polypropylene film, and aluminum
deposition was applied so that the metal film had a surface
resistivity of 20Ω/□, thereby obtaining a metal layer-inte-
grated polypropylene film. Next, after the metal layer-
integrated polypropylene film was silt to an arbitrary width,
the two metal layer-integrated polypropylene films were
combined, and the metal layer-integrated polypropylene
films were wound using an automatic winder 3KAW-N2
Type manufactured by KAIDO MANUFACTURING CO.,
LTD. at a winding speed of 4 m/sec, a winding tension of
180 g, and a contact roller contact pressure of 260 g while
setting the number of turns so that the element capacitance
was 50 μF.

After the element-wound element was pressed and flat-
tened, zinc metal was sprayed on the element end surface to
form an electrode extraction portion while the press load
was applied, followed by heat treatment at 120° C. for 15
hours for thermal curing.

After thermal curing, leads were soldered to the element
end surface and sealed with an epoxy resin to obtain a flat
film capacitor. The capacitance of all of the obtained film
capacitors was 50 μF (±3 μF).

The methods for evaluating deposition processability and
element-winding processability in the production process of
the film capacitor obtained in each of Examples and Com-
parative Examples, and the methods for evaluating the
lifetime characteristics and thermal shock resistance of the
film capacitor are shown below The results of each evalu-
ation are also shown in Table 2.

Deposition Processability

A case where a wrinkle formation rate due to thermal
deformation in the film after deposition is less than 5% was
regarded as "○", and a case where a wrinkle formation rate
is 5% or more was regarded as "x".

Element-Winding Processability Evaluation

Of the small rolls obtained by deposition and slitting, a
left-margin winding reel and a right-margin winding reel
were used to wind two superimposed films so that the deposition portions protruded beyond the margin portions in the width direction (element-winding process). The winding was performed for 1360 turns at a winding tension of 200 g using an automatic winder 3KAW-N2 Type manufactured by KAIDO MANUFACTURING CO., LTD. At that time, the films were visually observed from the start of winding to the end of winding, those with wrinkles or misalignment were determined to be rejected, and the ratio of the number of rejected products to the total number of products produced was expressed as a percentage and used as an index of processability (hereinafter, referred to as "element-winding yield"). A higher element-winding yield is more preferable. An element-winding yield of 95% or more was evaluated as good "○", and an element-winding yield of less than 95% was evaluated as poor "x".

Lifetime Characteristics (Capacitance Change Rate))

The initial capacitance of the obtained capacitor before the test was evaluated by an LCR Hi-Tester 3522-50 manufactured by HIOKI E.E. CORPORATION. Next, a direct current voltage of 800 V (348 V/μm) was continuously applied to the capacitor for 500 hours in a high-temperature chamber at 115° C. The capacitance of the capacitor after 500 hours was measured in the same manner, and the capacitance change rate before and after voltage application was calculated by the following equation. The test was conducted using two samples, and the average value thereof was used for evaluation.

$$(\text{Capacitance change rate})=[(\text{Capacitance after voltage application})-(\text{Initial capacitance})]/(\text{Initial capacitance})\times100(\%)$$

A capacitance change rate within −4% after 500 hours was regarded as good "○", a capacitance change rate of more than −4% and −6% or less was regarded as "Δ", and a capacitance change rate of more than −6% was regarded as poor "x".

Insulation Resistance at High Temperatures (High-Temperature IR)

For each capacitor obtained above, the insulation resistance at 115° C. was measured by the following method. A shielding box SME-8350 was connected to a super insulation resistance meter DSM8104 manufactured by HIOKI E.E. CORPORATION. A metallized film capacitor element was placed in the shielding box, and a direct current voltage of 750 V was applied. The insulation resistance value [unit: MΩ] after the lapse of 1 minute was read. The value was rounded off to the first decimal place. The measurement conditions other than those described herein were in accordance with "4.2.4 Insulation resistance" in JIS C 5101-16: 2009.

The product (CIR product) of the measured value and the nominal capacitance value (50 μF) of the capacitor element is shown in Table 3.

TABLE 3

| | Insulation resistance value at high temperatures of capacitor (MΩ · μF) |
|---|---|
| Example 1 | 20 |
| Example 2 | 20 |
| Example 3 | 20 |

TABLE 3-continued

| | Insulation resistance value at high temperatures of capacitor (MΩ · μF) |
|---|---|
| Example 4 | 20 |
| Example 5 | 20 |
| Example 6 | 20 |
| Comparative Example 1 | 15 |
| Comparative Example 2 | 15 |
| Comparative Example 3 | 10 |
| Comparative Example 4 | 10 |
| Comparative Example 5 | 5 |
| Comparative Example 6 | — |
| Comparative Example 7 | 15 |
| Comparative Example 8 | 10 |
| Comparative Example 9 | 10 |
| Comparative Example 10 | 10 |
| Comparative Example 11 | 10 |
| Comparative Example 12 | 10 |
| Comparative Example 13 | 10 |
| Comparative Example 14 | 10 |
| Comparative Example 15 | 10 |

The invention claimed is:

1. A polypropylene film comprising a polypropylene resin, the polypropylene resin having a molecular-weight distribution (Mw/Mn) of a weight-average molecular weight Mw to a number-average molecular weight Mn of 5.0 or more and 6.9 or less, having a Z-average molecular weight Mz of 950,000 or more and 1,500,000 or less, and having a weight proportion w of 2.6% or more and 4.0% or less when a logarithmic molecular weight Log (M) is 4.0 in an integral molecular-weight distribution curve.

2. A capacitor comprising the polypropylene film according to claim 1.

3. The polypropylene film according to claim 1, wherein the polypropylene film is a biaxially stretched film.

4. The polypropylene film according to claim 1, wherein a density as measured according to Method D in JIS K7112: 1999 is 919 kg/m³ or more and 925 kg/m³ or less.

5. The polypropylene film according to claim 1, wherein a dielectric breakdown strength (DCES) at a direct current voltage at 120° C. is 530 V/μm or more.

6. The polypropylene film according to claim 1, wherein the polypropylene resin contains a polypropylene resin A and a polypropylene resin B different from the polypropylene resin A, an Mw of the polypropylene resin A is 250,000 or more and less than 350,000, a molecular-weight distribution (Mw/Mn) of the polypropylene resin A is 5.5 or more and 10.0 or less, a melt flow rate (MFRA) of the polypropylene resin A is 3.0 g/10 min or more and 10.0 g/10 min or less, and a content of the polypropylene resin A in the polypropylene resin is larger than a content of the polypropylene resin B in the polypropylene resin.

7. The polypropylene film according to claim 6, wherein a ratio of a mass of the polypropylene resin A to a total mass of the polypropylene resin A and the polypropylene resin B is 55 mass % or more and 75 mass % or less.

8. The polypropylene film according to claim 1, wherein the polypropylene resin contains a polypropylene resin A and a polypropylene resin B different from the polypropylene resin A, an Mw of the polypropylene resin B is 300,000 or more and 550,000 or less, a molecular-weight distribution (Mw/Mn) of the polypropylene resin B is 5.0 or more and 11.0 or less, a melt flow rate (MFRB) of the polypropylene resin B is 0.1 g/10 min or more and 3.0 g/10 min or less, and a content of the polypropylene resin A in the polypropylene resin is larger than a content of the polypropylene resin B in the polypropylene resin.

9. The polypropylene film according to claim 1, wherein a thickness of the polypropylene film is 1.0 μm or more and 2.4 μm or less.

10. A film capacitor comprising a metal layer-integrated polypropylene film comprising:

the polypropylene film according to claim 1; and a metal layer laminated on one surface or both surfaces of the polypropylene film or a configuration in which a plurality of the metal layer-integrated polypropylene films are laminated, wherein an insulation resistance value at an ambient temperature of 115° C. is 20 MΩ·μF or more.

11. A film capacitor comprising a metal layer-integrated polypropylene film comprising:

a polypropylene film comprising a polypropylene resin, the polypropylene resin having a Z-average molecular weight Mz of 950,000 or more and 1,500,000 or less and having a dielectric breakdown strength (DCES) at a direct current voltage at 120° C. of 530 V/μm or more; and a metal layer laminated on one surface or both surfaces of the polypropylene film or a configuration in which a plurality of the metal layer-integrated polypropylene films are laminated, wherein an insulation resistance value at an ambient temperature of 115° C. is 20 MΩ·μF or more.

* * * * *